(12) United States Patent  
McChesney et al.

(10) Patent No.: US 9,350,868 B1  
(45) Date of Patent: May 24, 2016

(54) MANAGING VOICEMAIL SYSTEMS

(71) Applicant: United Services Automobile Association (USAA), San Antonio, TX (US)

(72) Inventors: Gregory McChesney, San Antonio, TX (US); Anthony Northington, San Antonio, TX (US); Sharron E. Wu, San Antonio, TX (US); Joey Edwards, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/206,357

(22) Filed: Mar. 12, 2014

Related U.S. Application Data

(60) Provisional application No. 61/777,923, filed on Mar. 12, 2013.

(51) Int. Cl.
*H04M 1/64* (2006.01)
*H04M 3/533* (2006.01)

(52) U.S. Cl.
CPC .................................. *H04M 3/533* (2013.01)

(58) Field of Classification Search
CPC ... H04M 3/436; H04M 3/4878; H04M 3/493; H04M 3/533; H04M 3/53366
USPC ......................................................... 379/88.22
See application file for complete search history.

(56) References Cited

U.S. PATENT DOCUMENTS

| 5,724,420 A * | 3/1998 | Torgrim .............. H04M 3/5158 379/265.07 |
| 7,551,917 B1 * | 6/2009 | Winner et al. ............. 455/414.1 |
| 8,391,844 B2 * | 3/2013 | Novick ............... H04M 1/7255 379/67.1 |
| 2010/0215157 A1 * | 8/2010 | Narayan ........... H04M 3/53391 379/88.19 |
| 2013/0005305 A1 * | 1/2013 | Lerda ................ H04M 3/53325 455/412.2 |

\* cited by examiner

*Primary Examiner* — Van D Huynh
(74) *Attorney, Agent, or Firm* — Fish & Richardson P.C.

(57) ABSTRACT

Methods, systems, and computer-readable and executable instructions for managing a voicemail system are described herein. One method for managing a voicemail system includes receiving a call log from a voicemail box subscribed to a voicemail management system, identifying metadata associated with the call log from the voicemail box, identifying one or more criteria within the metadata based on a request for a report, and generating a report using the one or more criteria within the metadata associated with the call log from the voicemail box to manage the voicemail system.

20 Claims, 7 Drawing Sheets

226 →

Voicemail Central - ************ Change

On the Date Range Monday, October 31, 2011 to Monday, November 07, 2011  Change

| Summary Tab | Voicemail Per Person | SLO | Trending | User Settings | Unit Preference |

Call Counts

| Total Hang-Ups & Voicemail Calls: | 929 |
| Total Voicemail Hang-Ups: | 564 |
| Total Voicemails: | 365 |

Response Time

| Current New Voicemails: | 0 |
| Current New Voicemails over SLO: | 0 |
| Current New Voicemails under SLO: | 0 |
| Current Read Voicemails: | 365 |
| Current Read Voicemails over SLO: | 137 |
| Current Read Voicemails under SLO: | 228 |
| Average Response Time: | 8 hours 54 minutes |

Voicemail Durations

| Average Message Length: | 37 seconds |
| Average New Message Length: | 37 seconds |
| Average Heard Message Length: | 3 hours 48 minutes 45 seconds |
| Total Message Length: | 3 hours 48 minutes 45 seconds |
| Total Read Message Length: | 3 hours 48 minutes 45 seconds |
| Total New Message Length: | |

Top Callers to Voicemail System

| Call Count | Caller Phone Number |
|---|---|
| 9 | 210 *** **** |
| 8 | 214 *** **** |
| 7 | 210 *** **** |
| 7 | 214 *** **** |

Voicemail Central - ************ Change   Reports To

On the Date Range Saturday, November 24, 2012 to Friday, November 30, 2012 Change

| Summary Tab | Voicemail Per Person | SLO | Trending | User Settings | Unit Preference |

Voicemail Settings

| Employee | Title | Phone Number | Custom Greeting Set | Custom Greeting Length | Preview Custom Greeting | OOO Greeting Set | OOO Greeting Length | Preview OOO Greeting | Current Greeting | Operatr Number |
|---|---|---|---|---|---|---|---|---|---|---|
| *******<br>********* | Mortgage Prcsr III | **** | 11/9/2012<br>12:21:45 PM | 22 seconds | △ | 11/9/2012<br>12:21:45 PM | 22 seconds | △ | Personalized Greeting | **** |
| *******<br>********* | Mort Prcsr III-Seasonal | ****** | Not Set | | | Not Set | | | *Personalized Greeting* | ****** |
| *******<br>********* | Mortgage Closer I | ****** | Not Set | | | | | | *Standard Greeting* | ****** |
| *******<br>********* | Mortgage Closer I | **** | 8/24/2012<br>6:02:20 AM | 24 seconds | △ | 8/24/2012<br>6:02:20 AM | 23 seconds | △ | Personalized Greeting | **** |
| *******<br>********* | Bank Manager | **** | 10/31/2012<br>5:17:23 PM | 15 seconds | △ | 10/31/2012<br>5:17:23 AM | 28 seconds | △ | Personalized Greeting | **** |
| *******<br>********* | Mortgage Prcsr II | **** | 6/5/2012<br>12:52:44 PM | 37 seconds | △ | 6/5/2012<br>12:52:44 PM | 35 seconds | △ | OOF Greeting | **** |
| *******<br>********* | Mortgage Prcsr I | **** | 10/27/2012<br>12:01:32 PM | 25 seconds | △ | 10/27/2012<br>12:01:32 PM | 19 seconds | △ | Personalized Greeting | **** |
| *******<br>********* | Mortgage Prcsr III | **** | 11/20/2012<br>4:51:40 PM | 29 seconds | △ | 11/20/2012<br>4:51:40 PM | 32 seconds | △ | Personalized Greeting | **** |
| *******<br>********* | Mortgage Prcsr II | **** | 11/21/2012<br>4:51:40 PM | 26 seconds | △ | 11/21/2012<br>4:51:40 PM | 33 seconds | △ | Personalized Greeting | **** |
| *******<br>********* | Mort Prcsr III-Seasonal | ****** | Not set | | | Not Set | | | *Personalized Greeting* | ****** |
| *******<br>********* | Mortgage Prcsr III | **** | 10/16/2012<br>6:53:02 PM | 24 seconds | △ | 10/16/2012<br>6:53:02 PM | 24 seconds | △ | Personalized Greeting | **** |

*Fig. 2C*

MANAGING VOICEMAIL SYSTEMS

CROSS-REFERENCE TO RELATED APPLICATIONS

This application is a Non-Provisional Application that claims the benefit of U.S. Provisional Application No. 61/777,923, filed Mar. 12, 2013, the entire specification of which are incorporated herein by reference.

TECHNICAL FIELD

The present disclosure relates to methods, systems, and computer readable medium for managing voicemail systems.

BACKGROUND

Entities, such as a company and/or an organization, can have a voicemail system for customers and/or other users to leave a voicemail message. For instance, a voicemail system can include a computer based system comprised of a plurality of voicemail boxes. A voicemail box can include a greeting and an operating space to store voicemail messages. Each voicemail box can be associated with a particular representative (e.g., an employee) from the entity, can be associated with a sub-portion of the entity (e.g., business unit), and/or can be a general voicemail box (e.g., associated with the entity as a whole).

BRIEF DESCRIPTION OF THE DRAWINGS

FIGS. 2A-2E illustrates examples of a user interface displaying a report according to an embodiment of the present disclosure.

DETAILED DESCRIPTION

Figure 1:
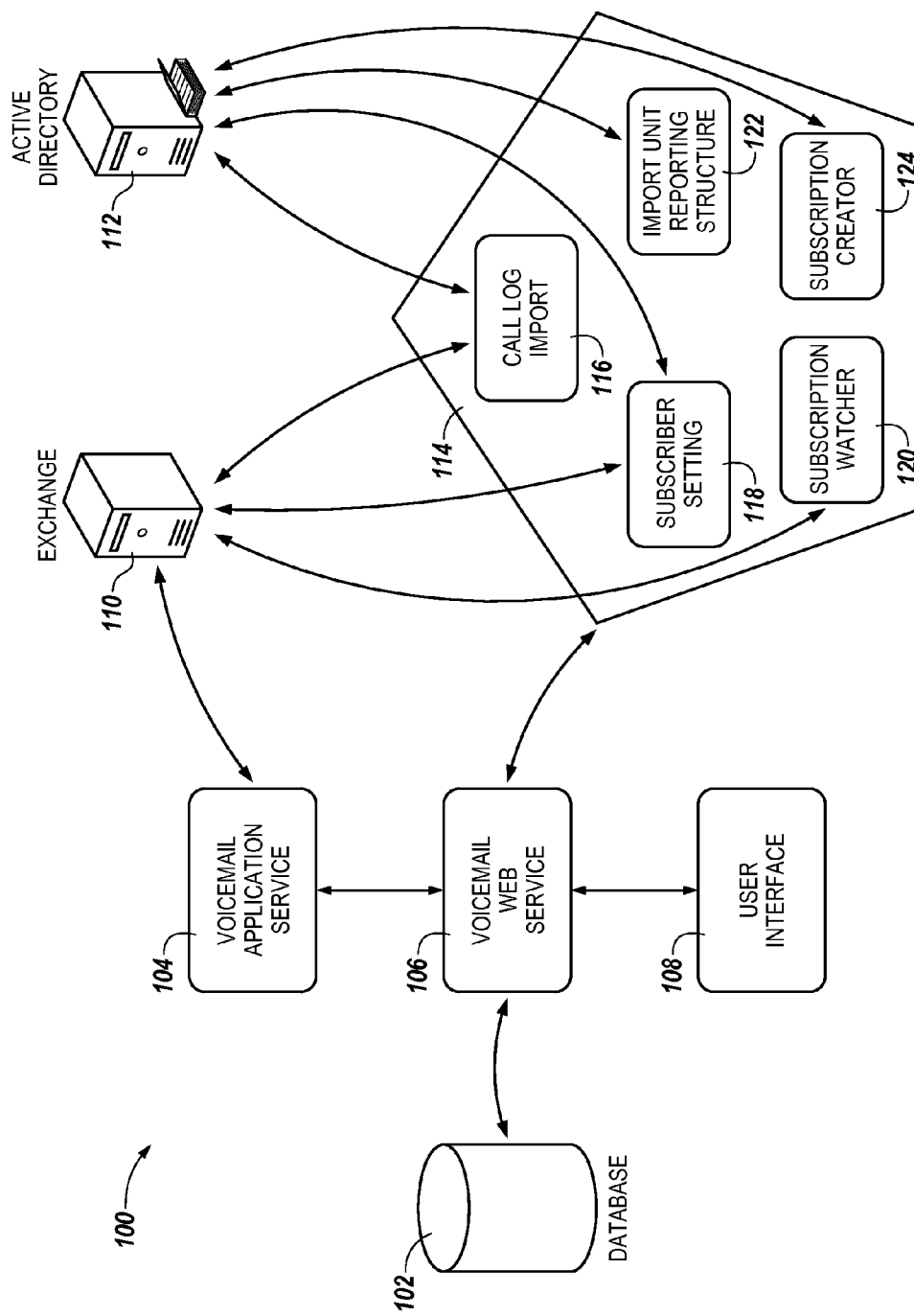
FIG. 1 illustrates a block diagram of an example of a system according to an embodiment of the present disclosure.

The present disclosure provides method, system, and computer readable medium embodiments for managing voicemail system.

Customers, business associates, and/or other users associated with an entity may call the entity to reach a particular representative of the entity, to perform a transaction and/or conduct business, and/or to resolve an issue, among other reasons. The entity can use a call center (e.g., a general number) comprising a number of representatives to handle the volume of calls, individual representatives may each have a unique phone number to be reached at, and/or a combination thereof. However, in some instances, the entity may not have enough human resources to answer each call as they are received and/or a particular representative may be unavailable. In such instances, the entity may use a voicemail system to allow the user to leave a voice message.

A voicemail system, as used herein, can include a computer based system that allows users (e.g., customers) and subscribers (e.g., representatives of the entity) to exchange personal voice messages, to select and deliver voice information, and to process transactions relating to the entity using an ordinary telephone. A user may leave a voicemail message using the voicemail system and/or may end the call prior to leaving a voicemail message, for instance. A subscriber, upon receiving one or more voicemail messages, can listen and/or respond to the one or more voicemail messages in the order received and/or based on a priority.

However, in various instances, an entity may have a volume of voicemail messages in their voicemail system that cannot be answered within a reasonable amount of time. For example, an entity may determine and/or set a goal to listen and/or respond to voicemail messages within one day. A particular subscriber and/or unit may have a volume of voicemail messages that represent more time than one day and, thereby, may be unable to listen and/or respond to all voicemail messages within the day goal. As a result, the entity may lose users (e.g., customers), may miss a business opportunity, and/or may tarnish their image.

Managing a voicemail system for an entity can assist an entity in retaining users and/or business opportunities, increasing revenue, increasing employee productivity, and/or increasing the entities reputations as compared to using a voicemail system and/or call center individually. Managing a voicemail system, in accordance with various embodiments, can include using a voicemail management system to manage the voicemail system. A voicemail management system, as used herein, can include hardware components and/or computer-readable instruction components designated and/or designed to track trends of the voicemail system to identify high volume voicemail times, trends of individual subscriber response times to voicemail messages, and a total time needed to listen to all active voicemail messages (e.g., queued voice messages). The voicemail management system can increase employee productivity by enabling management to proactively allocate human resources based on high voicemail message volume areas and/or times. Further, the voicemail management system can enhance user experience through reduced callback time as compare to an unmanaged voicemail system.

FIG. 1 illustrates a block diagram of an example of a system 100 according to an embodiment of the present disclosure. The system 100, as illustrated in the embodiment of FIG. 1, can include a voicemail management system 100 designation to manage a voicemail system.

The arrows illustrated in the embodiment of FIG. 1 represent communication between hardware and/or computer-readable instruction components. The communication can be performed, for instance, using application programming interfaces (APIs). An API, as used herein, can include a specification that can be used as an interface by computer-readable instruction components (e.g., software) to communicate.

As shown in the embodiment of FIG. 1, the voicemail management system 100 can include a multi-threaded voicemail service 114, an exchange service 110, an active directory 112, a voicemail application service 104, a voicemail web service 106, a database 102, and/or a user interface 108. A service, as used herein, can include hardware components and/or computer-readable instructions designated and/or designed to perform one or more functions.

The multi-threaded voicemail service 114, in various embodiments, can include multiple services. For instance, the multiple services can include a subscription creator service 124, a subscriber setting service 118, a call log import service 116, an import unit reporting structure service 122, and/or a subscription watcher service 120. The multiple services can be used individually and/or in combination to manage a voicemail system.

The subscription creator service 124 can include hardware components and/or computer-readable instruction components designated and/or designed to subscribe a plurality of voicemail boxes in the voicemail system to the voicemail management system 100. For example, subscribing the plurality of voicemail boxes can include identifying each of the plurality of voicemail boxes belongs to the voicemail system and is not subscribed to the voicemail management system 100, and sending a request to each voicemail box to subscribe to the voicemail management system 100. The subscription creator service 124 can be used to initially set-up the voicemail management system 100 (e.g., identify all mailboxes) and/or to identify new mailboxes added to the voicemail system (e.g., mailboxes belonging to the voicemail system that are not yet subscribed to the voicemail management system 100).

In various embodiments, the subscription creator service 124 can identify the plurality of voicemail boxes and/or identify a new mailbox by communicating with an active directory 112. An active directory 112, as used herein, can include a directory of the voicemail system containing central location information for network administration and security. For instance, the active directory 112 can contain user information, subscriber (e.g., representative) information, and/or configuration information. The subscription creator service 124 can, for example, search the active directory 112 to identify a voicemail box in the active directory 112 that has not subscribed to the voicemail management system 100. In response to identifying one or more unsubscribed voicemail boxes, the subscription creator service 124 can send a request to the one or more unsubscribed voicemail boxes to subscribe to the voicemail management system 100.

The subscriber setting service 118 can include hardware components and/or computer-readable instruction components designated and/or designed to analyze a voicemail greeting message of the one or more subscribed voicemail boxes. Analyzing the voicemail greeting message can include identifying metadata associated with the voicemail greeting message. Such voicemail greeting message metadata can include a time of the voicemail greeting message (e.g., amount of time of the message), the type of voicemail greeting message (e.g., standard message and/or out of the office message), last update of the voicemail greeting message, and/or metadata containing a converted text of the voicemail greeting message, among other metadata.

In some embodiments, the subscriber setting service 118 can be used to analyze the one or more voicemail greeting messages to identifying voicemail greeting message compliance. For example, each voicemail greeting message associated with a subscribed voicemail box can be compared to one or more user configured settings to identify greeting message compliance. The one or more user configured settings can include a threshold time of the voicemail greeting message and/or legal requirements, among other settings. The one or more user configured settings can be set by a managing representative (e.g., a manager of a business unit) and/or the entity as whole. As an example, a manager of a business unit A can set a maximum threshold voicemail greeting message time of thirty seconds. The subscriber setting service 118 can identify a voicemail greeting message that is outside the threshold time and send a notification to the manager and/or the particular subscriber indicating non-compliance with the user configured setting. Further, the subscriber setting service 118 can identify a voicemail greeting message of a voicemail box among the plurality of voicemail boxes is compliant with the user configured setting (e.g., the standards outlined by the entity).

In various embodiments, a user configured setting can include sending a notification to the manager and/or a verification employee in response to an update (e.g., change) of a voicemail greeting message. The subscriber setting service 118 can identify that a voicemail greeting message has been updated and send the notification. The manager and/or verification employee can review the updated voicemail greeting message to identify compliance with legal requirements and/or other settings.

Alternatively and/or in addition, the updated voicemail greeting message and/or new voicemail greeting message can be sent to an extraction engine (e.g., not shown in the embodiment of FIG. 1) to extract the text of the voicemail greeting message and compare the text to legal requirements. An extraction engine can, for instance, include hardware components and/or computer-readable instruction components that can extract text from a computer-readable document. For instance, the extraction engine can be configured to convert spoken words in the voicemail greeting message to text (e.g., voice recognition computer-readable instructions).

The call log import service 116 can include hardware components and/or computer-readable instruction components designated and/or designed to import a call log of one or more subscribed voicemail boxes. The call log imported (e.g., retrieved) can include active (e.g., queued) voicemail messages associated with the one or more voicemail boxes. An active voicemail message associated with a voicemail box can, for instance, include a voicemail on (e.g., recorded) and/or associated with a voicemail box.

Importing the call log can include mapping data from an exchange service 110 to data from an active directory 112. For instance, data from the active directory 112 can include time metadata associated with each active voicemail message (e.g., recorded time of the voicemail message, telephone number that left a voicemail message, and/or subscriber that received the voicemail message), and/or how many times a particular user has called, geographic metadata associated with users calling (e.g., geographic locations of users calling and/or leaving voicemail messages). Data from the exchange service 110 can include the recorded voicemail messages and/or logs of missed calls.

The import unit reporting structure service 122 can include hardware components and/or computer-readable instruction components designated and/or designed to import (e.g., retrieve) a unit reporting structure of the entity. A unit reporting structure, as used herein, can include a hierarchy of unit reporting. The hierarchy can include reporting within the unit and/or unit to unit. A unit, as used herein, can include a sub-portion of an entity. For example, the hierarchy of unit reporting can include reporting from individual representatives to the executive of each unit. In various examples, the imported hierarchy can be used to generate reports that can aggregate from individual representatives to the executive of each unit of the entity (e.g., as discussed further herein). The import unit reporting structure service 122 can import the hierarchy from the active directory 112, for instance.

The subscription watcher service 120 can include hardware components and/or computer-readable instruction components designated and/or designed to identifying a subscribed voicemail box that is unsubscribed and re-subscribe the voicemail box. For instance, a voicemail box may be unintentionally and/or accidentally unsubscribed from the voicemail management system 100. The subscription watcher service 120 can identify the unsubscribed voicemail box by searching the exchange service 110 and re-subscribe the voicemail box.

In some embodiments of the present disclosure, the voicemail management system 100 can include a voicemail application service 104. The voicemail application service 104 can be notified of changes to a voicemail box in the voicemail system and/or to store data and/or metadata associated with subscribed voicemail boxes. For instance, the voicemail application service 104 can be notified of a change in a voicemail box by communicating with the exchange service 110. Further, the voicemail application service 104 can update metadata in a database 102 using the voicemail web service 106 (e.g., as further discussed herein). As an example, imported call log data can be merged with data from a voice mailbox to gather information when a particular voicemail message arrives (e.g., and can be used to update an estimated time to get to the particular voicemail message).

The multi-threaded voicemail service 114 can be used to identify metadata associated with the one or more subscribed voicemail boxes. The metadata identified can be stored in a database 102 using a voicemail web service 106. The voicemail web service 106, as used herein, can include hardware components and/or computer-readable instruction components designated and/or designed to update a database with the identified voicemail box metadata. An example voicemail web service 106 can include a voicemail Structured Query Language (SQL) service.

A database 102 can include a database to store voicemail box metadata. A database, as used herein, can include an organized collection of data and/or computer components (e.g., storage and/or memory). As an example, the database 102 can include a SQL database. The database 102 can be connected and/or in communication with the voicemail web service 106. The voicemail web service 106, for instance, can aggregate the desired fields in the database 102 for compatibility and access for reporting.

For example, the database 102 can include a database that can be queried to provide for managing the voicemail system. The database 102 can be queried, for example, to provide a report of voicemail message trends in the voicemail system, reporting on a specific unit and/or subscriber to identify compliance with user configured settings, and track history for trending purposes (e.g., year to year).

A user interface 108 can include hardware components and/or computer-readable instruction components for subscribers and/or other persons associated with the entity to interact with a computing device using text commands and/or images. The user interface 108 can include a web based user interface, for instance. For example, a subscriber, manager, and/or other person associated with the entity can use the user interface 106 to set user configurable settings and/or to set personal goals. Based on the user configurable setting and/or personal goals, a notification can be sent to the subscriber, manager, and/other persons.

In various embodiments, a subscriber, manager, and/or other person associated with the entity can use the user interface 108 to request a report. A report, as used herein, can include a summary of metadata formulated based on inputs from the subscriber, manager, and/or other person. A report can be generated, in response to the request, using the metadata identified by the multi-threaded voicemail service 114 and stored in the database 102 using the voicemail web service 106 to query the database 102.

For example, in response to a request for a report, one or more criteria within the metadata can be identified. The one or more criteria can include, for instance, one or more portions of the metadata of one or more voicemail boxes subscribed to the voicemail management system 100. For example, the one or more criteria can be based on the particular report requested. Using the one or more criteria within the metadata, a report can be generated and/or used to manage the voicemail system.

FIGS. 2A-2E illustrates examples of a user interface displaying a report according to an embodiment of the present disclosure. The reports can be generated, for instance, in response to a request by a subscriber and/or other person associated with the entity (e.g., a manager).

Each report can be generated, for instance, using one or more criteria within metadata associated with one or more call logs of one or more voicemail boxes subscribed to the voicemail management system. For instance, the one or more criteria can be identified based on a request for a particular report. The particular report request can, for example, require particular portions of metadata from particular voicemail boxes subscribed to the voicemail management system to generate (e.g., populate) the requested report. The one or more criteria within the metadata can be used to generate the request. For instance, the criteria can itself populate portions of the report and/or a calculation can be performed using the one or more criteria (e.g., summarize a total time for a particular voicemail box, for a unit of the entity, for a period of time, etc.).

FIG. 2A illustrates an example of a user interface displaying a summary report 226. A summary report, as used herein, can include a summary of a voicemail system managed by a voicemail management system. For instance, the summary can include call counts (e.g., total hang-ups, total voicemail calls, total voicemail hang-ups, and total voicemail messages), response times (e.g., new voicemail messages, read voicemail messages, and average response time), and voicemail message durations (e.g., average voicemail message length, average new voicemail message length, average heard voicemail message length, total voicemail message length, total read voicemail message length, total new voicemail message length).

To generate the summary report 226, for instance, metadata associated with the summary can be identified. That is, one or more criteria within the metadata can be identified. Using the above provided examples, the one or more criteria within the metadata can include metadata associated with call counts, response times, and/or voicemail message durations, among other metadata. Using the identified criteria, the summary reports 226 can be generated. For instance, the generation can include using the one or more criteria within the metadata to populate the summary report 226. As an example, metadata associated with call counts can be used to calculate total call counts of the voicemail system.

As an example, the response times can include new voicemail messages and read voicemail messages. New voicemail messages can include voicemail messages that are unread. A summary of response times for new voicemail messages can include a number of new voicemail messages, new voicemail messages over service level objectives (SLOs) (e.g., as discussed further herein), and new voicemail messages under SLO. A summary of response times for read voicemail messages can include number of read voicemail messages, read voicemail messages over SLOs, and read voicemail messages under SLOs.

Figure 2B:
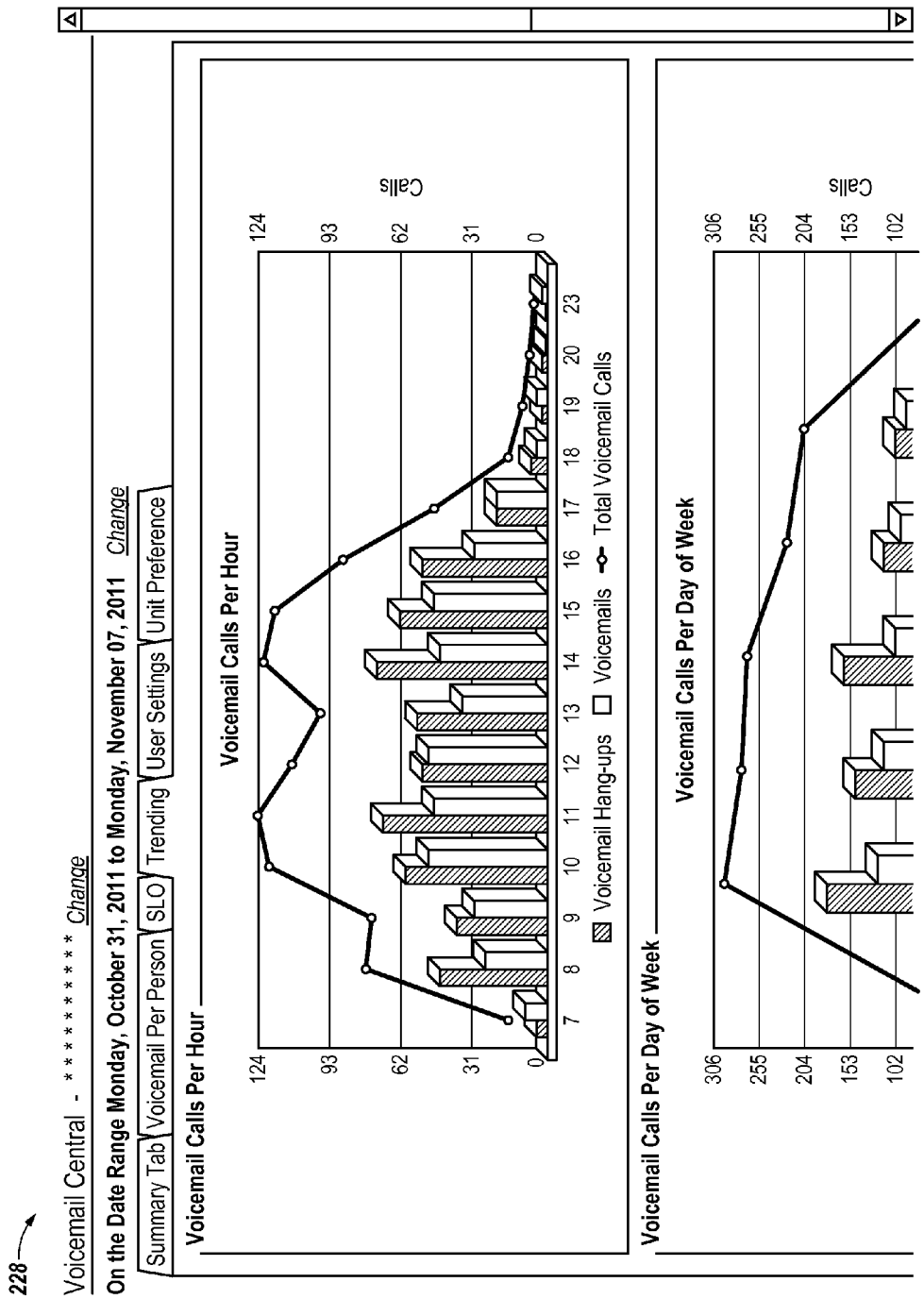

FIG. 2B illustrates an example of a user interface displaying a trending report 228. A trending report, as used herein, can include trends of voicemail calls and/or messages in a voicemail system managed by a voicemail management system. The trending report 228 can be for an entire voicemail system and/or a sub-portion of the voicemail system.

As illustrated in the embodiment FIG. 2B, the trending reporting 228 can include a graphical representation of the number of voicemail calls per hour and/or number of voicemail calls per day of the week. The trending report 228 can include voicemail hang-ups, voicemail messages (e.g., new voicemail messages and read voicemail messages), and total voicemail calls (e.g., voicemail hang-ups plus voicemail messages).

To generate the trending report 228, for instance, metadata associated with the report request can be identified. That is, one or more criteria within the metadata can be identified. Using the above provided examples, the one or more criteria within the metadata can include metadata associated with voicemail hang-ups, voicemail messages, and/or total voicemail calls, among other metadata. Using the identified criteria, the trending report 228 can be generated. For instance, the generation can include using the one or more criteria within the metadata to populate the trending report 228. As an example, metadata associated with call counts can be used to calculate a number of voicemail calls per hour and/or per day of the week.

FIG. 2C illustrates an example of a user interface displaying a report of subscriber settings 230. A subscriber settings report, as used herein, can include a summary of settings of the one or more subscribed voicemail boxes. The summary can include title of the subscriber (e.g., representative), phone number, identification of a custom voicemail greeting message, length of the custom voicemail greeting message, identification of an out of office (e.g., OOO) voicemail greeting message, length of the out of office voicemail greeting message, identification of current voicemail greeting message the mailbox is set to (e.g., custom, out of office, standard), and an operator number. Thereby, a report of subscriber settings (e.g., 230) can be used to identify and/or verify compliance of subscribers with voicemail greeting message requirements (e.g., user configured settings and/or SLOs).

As illustrated in the embodiment of FIG. 2C, the user interface displaying a report of subscriber settings 230 can include one or more preview voicemail greeting message icons. A preview voicemail greeting message icon, such as preview custom greeting and preview out of the office greeting, can include an icon that connects a person to a voicemail greeting message. For instance, a manager and/or other person can select a particular preview voicemail greeting message icon and listen to a particular greeting message of a particular subscriber.

To generate the subscriber setting report 230, for instance, metadata associated with the subscriber settings can be identified. That is, one or more criteria within the metadata can be identified. Using the above provided examples, the one or more criteria within the metadata can include metadata associated with the title of the subscriber, phone number, identification of a custom voicemail greeting message, length of the custom voicemail greeting message, identification of an OOO voicemail greeting message, length of the OOO voicemail greeting message, identification of current voicemail greeting message the mailbox is set to, and/or an operator number, among other metadata. Using the identified criteria, the subscriber setting report 230 can be generated. For instance, the generation can include using the one or more criteria within the metadata to populate the subscriber setting report 230. As an example, the one or more criteria identified can be used to generate a report that identifies and/or verifies compliance and/or non-compliance of subscribers with voicemail greeting message requirements.

Figure 2D:
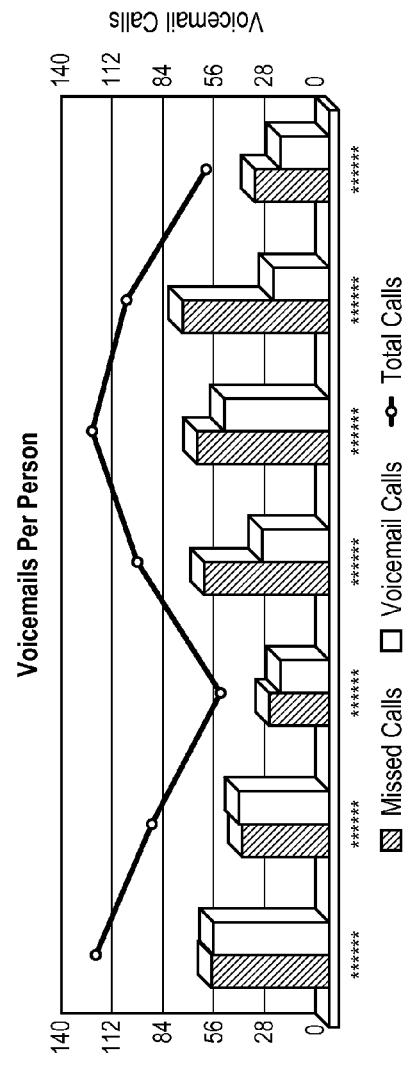

FIG. 2D illustrates an example of a user interface displaying a report of a sub-portion of voicemail boxes managed 232. The report of a sub-portion of voicemail boxes managed can include a summary of voicemail calls associated with a sub-portion an entity. Example sub-portions of an entity can include a unit, a geographic location, and a region, among other examples.

As illustrated in the embodiment of FIG. 2D, the report of a sub-portion of voicemail boxes managed 232 can include identification of one or more subscribers in the sub-portion, total missed calls per subscriber, total voicemail messages per subscriber, and total voicemail call count per subscriber. Alternatively and/or in addition, the report 232 can include a graphical representation of the number of voicemails calls per subscriber including missed calls, voicemail messages (e.g., new and read voicemail messages), and total voicemail calls (e.g., missed calls plus voicemail messages).

To generate the report of the sub-portion of voicemail boxes managed 232, for instance, metadata associated with the sub-portion of voicemail boxes can be identified. That is, one or more criteria within the metadata can be identified. Using the above provided examples, the one or more criteria within the metadata can include metadata associated with total missed calls per subscriber, total voicemail messages per subscriber, and/or total voicemail call count per subscriber of one or more subscribes in the sub-portion, among other metadata. Using the identified criteria, the report of the sub-portion of voicemail boxes managed 232 can be generated. For instance, the generation can include using the one or more criteria within the metadata to populate the report 232. As an example, metadata associated with call counts can be used to calculate total call counts of the sub-portion of the voicemail system.

Figure 2E:
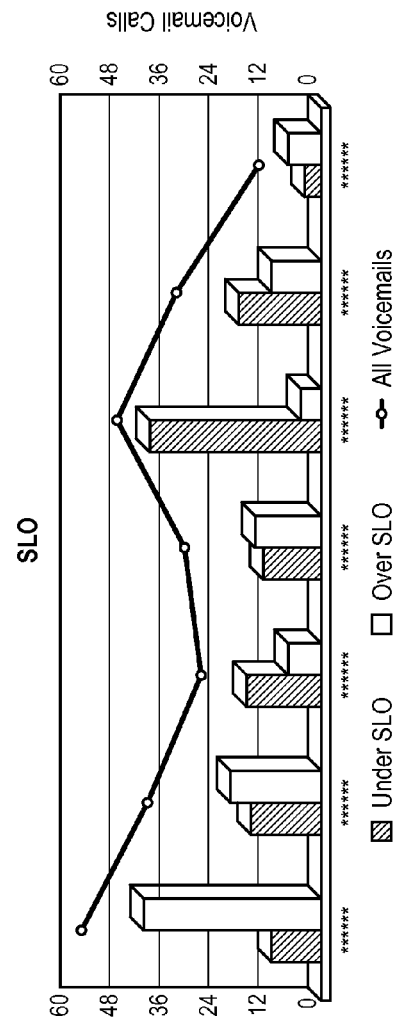

FIG. 2E illustrates an example of a user interface displaying a service level objective (SLO) report 234. A SLO report, as used herein, can include a report summarizing voicemail messages of a sub-portion of the entity responded to within a SLO. A SLO, as used herein, can include a user configurable setting identifying a time threshold for a voicemail message to be responded to. SLOs, in various embodiments, can be set for each sub-portion of the entity (e.g., unit).

As illustrated in the embodiment of FIG. 2E, the SLO report 234 can include identification of the subscribers in the sub-portion, total voicemail messages answered under the SLO per subscriber, total voicemail messages answered over the SLO per subscriber, and total voicemail message count per subscriber. Alternatively and/or in addition, the report 234 can include a graphical representation of the number of voicemail messages answered under SLO per subscriber, number answered over SLO per subscriber, and total voicemail messages.

To generate the SLO report 234, for instance, metadata associated with the sub-portion of voicemail boxes can be identified. That is, one or more criteria within the metadata can be identified. Using the above provided examples, the one or more criteria within the metadata can include metadata associated with total voicemail messages answered under the SLO per subscriber, total voicemail messages answered over the SLO per subscriber, and total voicemail message count per subscriber of subscribers and/or a sub-portion of subscribers of the voicemail management system, among other metadata. Using the identified criteria, SLO report 234 can be generated. For instance, the generation can include using the one or more criteria within the metadata to populate the SLO report 234. As an example, metadata associated with call counts can be used to calculate the number of voicemail messages answered under SLO per subscriber, number answered over SLO per subscriber, and total voicemail messages.

As illustrated in the embodiments of FIGS. 2C, 2D, and 2E, user interfaces in accordance with the one or more embodiments of the present disclosure can include identification of particular subscribers. The identification of the particular subscribers can, for instance, include an icon. As an example, a manager and/or other person can select the icon of a particular subscriber and retrieve a user interface containing a report of the particular subscriber. A report of the particular subscriber, as used herein, can include a summary of voicemail messages and calls made to the particular subscriber's voicemail box.

Figure 3:
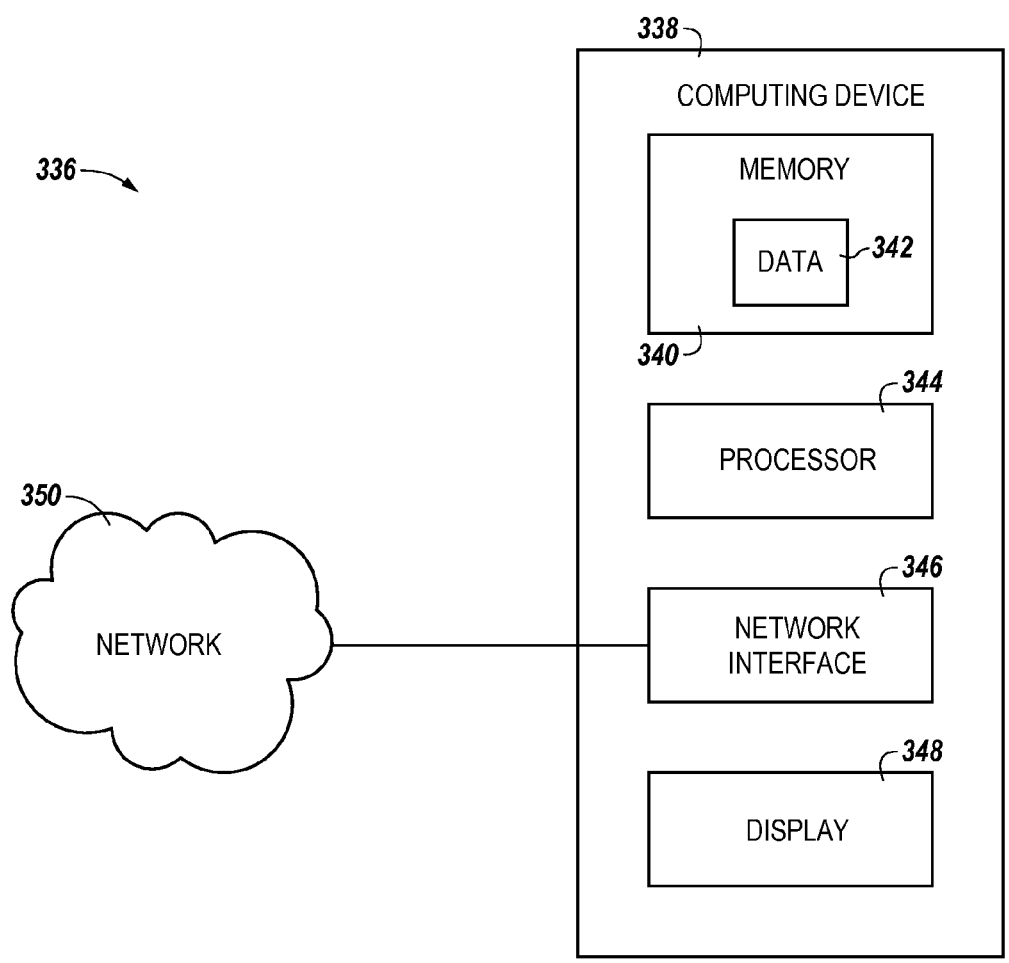
FIG. 3 illustrates a block diagram of an example computing system according to an embodiment of the present disclosure.

FIG. 3 illustrates a block diagram of an example computing system 336 according to an embodiment of the present disclosure. The computing system 336 can be utilized with one or more embodiments of the present disclosure. The computing system 336 can include a computing device 338. The computing device 338 can be, for example, a laptop computer and/or a desktop computer, among other types of computing devices.

The computing device 338 can include a memory 340 and a processor 344 coupled to memory 340. For example, the memory 340 can include various types of information including data 342 and executable instructions, as discussed herein. Memory 340 can be any type of storage medium that can be accessed by processor 344 to perform various examples of the present disclosure (e.g., request a voicemail box in the voicemail system subscribe to a voicemail management system, etc.) For example, memory 340 can be a non-transitory computing device readable medium having computing device readable instructions (e.g., computing device program instructions, machine readable instructions, computer readable instructions, etc.) and data 342 stored thereon. The computing device readable instructions are executable by processor 344 to perform various examples of the present disclosure. The data 342 can be used (e.g., analyzed by) the computing device readable instructions during their execution.

Memory 340 can be volatile or nonvolatile memory. Memory 340 can also be removable (e.g., portable) memory, or non-removable (e.g., internal) memory. For example, memory 340 can be random access memory (RAM) (e.g., dynamic random access memory (DRAM) and/or phase change random access memory (PCRAM), read-only memory (ROM) (e.g., electrically erasable programmable read-only memory (EEPROM) and/or compact-disc read-only memory (CD-ROM), flash memory, a laser disc, a digital versatile disc (DVD) or other optical disk storage, and/or a magnetic medium such as magnetic cassettes, tapes, or disks, among other types of memory.

Further, although memory 340 is illustrated as being located in computing device 338, embodiments of the present disclosure are not so limited. For example, memory 340 can, in addition to or alternatively, be located internal to another computing resource (e.g., enabling computer readable instructions to be downloaded over the Internet or another wired or wireless connection).

The computing device 338 can include a network interface 346. Network interface 346 can connect the computing device 338 to a network, such as network 350 illustrated in FIG. 3.

Network 350 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 350) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 350 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network. For instance, the network 350 can be used to connect and/or communicate between devices and/or applications of a system, such as illustrated in the embodiment of FIG. 1 (e.g., system 100).

The computing device 338 can also include a display 348. Display 348 can include, for example, a screen that can provide (e.g., display and/or present) information to a user of computing device 338. For instance, the display 348 can be used to display a user interface associated with the voicemail system.

Additionally, computing device 338 can receive information from the user of computing device 338 through an interaction with the user via display 348. For example, computing device 338 can receive input from the user (e.g., a person associated with the entity) via display 348 (e.g., a touch screen display or via another user input device such as a keyboard in response to interaction with items show on the display). For example, the user can enter the input into computing device 338 using, for instance, a mouse and/or keyboard associated with computing device 338 (e.g., display 348). For instance, a user can enter input to cause the computing device 338 to generate a report. The report can, for example, be shown on the display 348.

In one or more embodiments, the processor 344, in association with memory 340, can be associated with data 342 and/or application modules (e.g., not shown in FIG. 3). The processor 344, in association with the memory 340, can store and/or utilize data and/or execute instructions to provide a number of application modules for managing a voicemail system.

As used herein, a module can be a stand-alone program or portion of a program or can be a set of code that provides a particular functionality and may not be stand alone and may not even include instructions interspersed within a set of code. Such application modules can include subscription creator module, subscriber setting module, call log import module, and/or metadata module.

Subscription creator module can, for example, be configured to request a voicemail box in the voicemail system subscribe to a voicemail management system. For instance, the subscription creator module can search for information (e.g., data) from an active directory associated with the entity (e.g., as illustrated in of FIG. 1).

Subscriber setting module can be configured to compare a voicemail greeting message of the voicemail box (e.g., requested to subscribe) to a user configured setting to identify voicemail greeting message compliance. The subscriber setting module can, for instance, communicate with the exchange service and the active directory to identify compliance. The user configured setting can, for instance, include an SLO.

Call log import module can, for example, be configured to import a call log of one or more voicemail boxes. A call log can include active voicemail messages associated with a voicemail box. The call log import module can, for instance, communicate with the exchange service and the active directory to retrieve data.

A metadata module can be configured to identify metadata associated with the voicemail box to manage the voicemail system. Identifying metadata can include mapping data from the exchange service to data from the active service. The identified metadata can, for instance, be stored in a database and be queried to generate reports.

In various embodiments of the present disclosure, the system 336 can include a forward voicemail module. A forward voicemail module can be configured to forward active voicemail messages associated with a voicemail box to a delegate subscriber in response to subscriber input. The subscriber input can be from a subscriber that is associated with the voicemail box. The input can include an indication that the subscriber is not in the office and/or unavailable to answer voicemail messages, for example. The delegate subscriber can include a delegate representative of the entity that the voicemail messages can be forwarded to. For instance, the voicemail messages can be forwarded to a voicemail box associated with the delegate representative.

In one or more embodiments of the present disclosure, the system 336 can include an alert module. An alert module can be configured to send an alert to a subscriber in response to the identified metadata including a voicemail message (e.g., an active voicemail message) not responded to within a threshold period of time. The threshold period of time can a user configured setting. An alert, as used herein, can include a message (e.g., email, text box, text message) sent to the subscriber. The alert module can communicate with the voicemail web service, for instance, to query the database to identify metadata outside a threshold period of time. The threshold period of time can, for instance, include an SLO and/or a user configured setting.

In various embodiments, a threshold period of time can include multiple thresholds. For instance, in response to identifying a voicemail message from customer A has not been answered within a first threshold period of time, the voicemail message can be forwarded to an alternative voicemail box (e.g., delegate voicemail box). In response to identifying the voicemail message from customer A has not been answered within a second threshold period of time, the voicemail message can be routed to a voicemail repository and an alert can be sent to the subscriber responsible for answering the voicemail message and/or to the manager of the subscriber.

In a number of embodiments, the system 336 can include a report module. The report module can be configured to identify one or more criteria within the metadata based on a request for a report and generate the report using the identified one or more criteria within the metadata associated with the call logs of the plurality of voicemail boxes to manage the voicemail system. Generating the report can include using the one or more criteria to populate the report requested. For instance, the one or more criteria (e.g., metadata) can be populated in the report and/or can be used to calculate values for the report. A graphical representation of the generated report can be displayed on the display 348, for example.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a" or "a number of" used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed:

1. A computer implemented method for managing a voicemail system, comprising:
   receiving a call log from a voicemail box subscribed to a voicemail management system;
   identifying metadata associated with the call log from the voicemail box, wherein identifying the metadata includes identifying an amount of time taken by a user to act with respect to one or more voicemail messages on the voicemail box;
   identifying one or more criteria within the metadata based on a request for a report; and
   generating the report using the one or more criteria within the metadata associated with the call log from the voicemail box to manage the voicemail system.

2. The method of claim 1, including:
   identifying a new voicemail box in the voicemail system; and
   sending a request to the new voicemail box to subscribe to the voicemail management system.

3. The method of claim 1, wherein identifying the metadata includes identifying geographic locations of one or more users calling.

4. The method of claim 1, wherein identifying the metadata includes identifying an amount of time taken to respond to one or more voicemail messages on the voicemail box.

5. The method of claim 1, including sending an alert to a subscriber associated with the voicemail box in response to the identified metadata including an active voicemail message not responded to within a threshold period of time.

6. The method of claim 1, including generating the report using the identified metadata associated with the call log of the voicemail box in response to the request.

7. A non-transitory computer-readable medium storing a set of instructions executable by a processor to cause a computing device to:

request the voicemail box in a voicemail system subscribe to a voicemail management system;

compare a greeting message of the voicemail box to a user configured setting to identify greeting message compliance;

import a call log of the voicemail box including active voicemail messages;

identify metadata associated with the call log of the voicemail box to manage the voicemail system, wherein identifying the metadata includes identifying an amount of time taken by a user to act with respect to one or more voicemail messages on the voicemail; identify one or more criteria within the metadata based on a request for a report; and generate the report using the one or more criteria within the metadata associated with the call log from the voicemail box to manage the voicemail system.

8. The non-transitory medium of claim 7, wherein the set of instructions executable by the processor include instructions to set the user configured setting in response to user input.

9. The non-transitory medium of claim 7, wherein the set of instructions executable by the processor include instructions to automatically forward voicemail messages associated with the voicemail box to a delegate subscriber in response to user input.

10. The non-transitory medium of claim 7, wherein the set of instructions executable by the processor include instructions to:

identify a voicemail message has not been answered in a threshold period of time; and forward the identified voicemail message to an alternative voicemail box.

11. The non-transitory medium of claim 7, wherein the set of instructions executable by the processor include instructions to identify a change in the subscribed voicemail box.

12. The non-transitory medium of claim 7, wherein the set of instructions executable by the processor to import the call log include instructions to map data from an exchange server to data from an active directory.

13. A system, comprising:

a memory having computer-readable instructions stored thereon; and a processor coupled to the memory and configured to execute the computer-readable instructions to:

subscribe a plurality of voicemail boxes in the voicemail system to a voicemail management system;

analyze a voicemail greeting message of each of the plurality of voicemail boxes based on a user configured setting to identify voicemail greeting message compliance;

import call logs of the plurality of voicemail boxes including active voicemail messages associated with each of the plurality of voicemail boxes;

identify metadata associated with the call logs of the plurality of voicemail boxes, wherein identifying the metadata includes identifying an amount of time taken by a user to act with respect to one or more voicemail messages on the voicemail;

identify one or more criteria within the metadata based on a request for a report; and generate the report using the identified one or more criteria within the metadata associated with the call logs of the plurality of voicemail boxes to manage the voicemail system.

14. The system of claim 13, wherein the report includes at least one of a subscriber setting report, a trending report, a summary report, a report of a subportion of voicemail boxes subscribed to the voicemail management system, and a service level objective report.

15. The system of claim 13, wherein the processor configured to execute computer-readable instructions to generate the report includes instructions executed to generate a report including a summary of a hierarchy of a reporting structure of voicemail boxes subscribed to the voicemail management system.

16. The system of claim 13, wherein the processor configured to execute computer-readable instructions to generate the report include instructions executed to generate the report including a sum of voicemail message time left on a hierarchy of voicemail boxes.

17. The system of claim 13, wherein the processor configured to execute computer-readable instructions to:

search a directory of the voicemail system to identify a new voicemail box in the voicemail system;

request the new voicemail box subscribe to the voicemail management system.

18. A system, comprising:

a memory having computer-readable instructions stored thereon; and a processor coupled to the memory and configured to execute the computer-readable instructions to:

subscribe a plurality of voicemail boxes in the voicemail system to a voicemail management system;

analyze a voicemail greeting message of each of the plurality of voicemail boxes based on a user configured setting to identify voicemail greeting message compliance;

import call logs of the plurality of voicemail boxes including active voicemail messages associated with each of the plurality of voicemail boxes;

identify metadata associated with the call logs of the plurality of voicemail boxes;

identify one or more criteria within the metadata based on a request for a report;

generate the report using the identified one or more criteria within the metadata associated with the call logs of the plurality of voicemail boxes to manage the voicemail system identify a voicemail greeting message of a voicemail box among the plurality of voicemail boxes that is outside a threshold time, wherein the user configured setting includes the threshold time; and send a notification to a manager and/or a subscriber of the voicemail box indicating non-compliance with the user configured setting.

19. The system of claim 13, wherein the processor configured to execute computer-readable instructions to identify a subscribed voicemail box has unsubscribed and re-subscribe the voicemail box.

20. The system of claim 13, wherein the processor configured to execute computer-readable instructions to identify a voicemail greeting message of a voicemail box among the plurality of voicemail boxes is compliant with the user configured setting.

* * * * *